United States Patent
Sakamoto (10) Patent No.: US 11,072,206 B2
(45) Date of Patent: Jul. 27, 2021

(54) PNEUMATIC TIRE

(71) Applicant: TOYO TIRE & RUBBER CO., LTD., Itami (JP)

(72) Inventor: Sachio Sakamoto, Itami (JP)

(73) Assignee: TOYO TIRE CORPORATION, Itami (JP)

(*) Notice: Subject to any disclaimer, the term of this patent is extended or adjusted under 35 U.S.C. 154(b) by 219 days.

(21) Appl. No.: 16/233,294

(22) Filed: Dec. 27, 2018

(65) Prior Publication Data
US 2019/0217667 A1 Jul. 18, 2019

(30) Foreign Application Priority Data

Jan. 17, 2018 (JP) .............................. JP2018-005778

(51) Int. Cl.
*B60C 11/03* (2006.01)
*B60C 11/00* (2006.01)
*B60C 11/13* (2006.01)

(52) U.S. Cl.
CPC ........ *B60C 11/0083* (2013.01); *B60C 11/033* (2013.01); *B60C 11/0304* (2013.01); *B60C 11/0316* (2013.01); *B60C 11/1376* (2013.01); *B60C 11/0306* (2013.01); *B60C 2011/0341* (2013.01); *B60C 2011/0381* (2013.01)

(58) Field of Classification Search
CPC ... B60C 11/033; B60C 11/1376; B60C 11/13; B60C 11/0083
See application file for complete search history.

(56) References Cited

U.S. PATENT DOCUMENTS

| | | | |
|---|---|---|---|
| 2003/0136487 A1* | 7/2003 | Radulescu | B60C 11/042 152/209.15 |
| 2004/0045649 A1* | 3/2004 | Lopez | B60C 11/11 152/209.1 |
| 2006/0108039 A1* | 5/2006 | Kaji | B60C 11/1392 152/209.15 |
| 2016/0009142 A1* | 1/2016 | Tada | B60C 5/00 152/209.15 |

(Continued)

FOREIGN PATENT DOCUMENTS

| | | |
|---|---|---|
| CN | 107206842 A | 9/2017 |
| DE | 60200634 T2 | 6/2005 |

(Continued)

OTHER PUBLICATIONS

JP H09142106 Machine Translation, Masayuki, Oshima (Year: 1997).*

(Continued)

*Primary Examiner* — Katelyn B Whatley
*Assistant Examiner* — Nicholas J Weiler
(74) *Attorney, Agent, or Firm* — Westerman, Hattori, Daniels & Adrian, (57) ABSTRACT

A pneumatic tire has a plurality of main grooves extending in a tire circumferential directions and a plurality of land lines defined by the plurality of main grooves, on a tread face. At least one of the plurality of land lines protrudes outward in a tire diametrical direction from a profile line. A void ratio of a first area positioned on one side of a center of a width of the at least one land line is larger than a void ratio of a second area positioned on the other side. A protruding height of the second area from the profile line is larger than a protruding height of the first area.

7 Claims, 6 Drawing Sheets

(56) References Cited

U.S. PATENT DOCUMENTS

| | | | | |
|---|---|---|---|---|
| 2016/0068023 A1* | 3/2016 | Kunugi | ..................... | B60C 3/04 |
| | | | | 152/209.15 |
| 2017/0182849 A1 | 6/2017 | Uchida | | |
| 2018/0072108 A1* | 3/2018 | Jacobs | ................ | B60C 11/1376 |
| 2018/0079258 A1* | 3/2018 | Suga | ........................ | B60C 5/00 |

FOREIGN PATENT DOCUMENTS

| | | | | |
|---|---|---|---|---|
| DE | 102015212995 A1 | | 1/2016 | |
| DE | 112015002487 T5 | | 5/2017 | |
| JP | 7-025208 A | | 1/1995 | |
| JP | H09142106 A | * | 6/1997 | ......... B60C 11/1376 |
| JP | 2010120534 A | * | 6/2010 | |
| JP | 2015-182680 A | | 10/2015 | |
| JP | 2016-055725 A | | 4/2016 | |
| JP | 2017-019398 A | | 1/2017 | |
| JP | 2017-30635 A | | 2/2017 | |
| WO | 2016/148123 A1 | | 9/2016 | |

OTHER PUBLICATIONS

Office Action dated Aug. 4, 2020, issued in counterpart CN Application No. 201811546939.2, with English translation (18 pages).
Office Action dated Jan. 20, 2021, issued in counterpart DE Application No. 102018133610.1, with English Translation. (16 pages).
Office Action dated Feb. 5, 2021, issued in counterpart CN Application No. 201811546939.2, with English Translation. (11 pages).

* cited by examiner

PNEUMATIC TIRE

BACKGROUND OF THE INVENTION

Field of the Invention

The present invention relates to a pneumatic tire with a land line protruding outward in a tire diametrical direction from a profile line.

Description of the Related Art

Normally, a plurality of land lines are provided on a tread face of a pneumatic tire and top faces of the respective land lines are aligned with a profile line forming an arc shape in a section along a tire meridian, on the other hand, as described in Patent Documents 1 and 2, there are known pneumatic tires each of which has land lines protruding outward in a tire diametrical direction from a profile line, such a tread configuration is intended for improvement of a contact property of a tread face and more concretely for increase of irregular wear resistance and braking performance by uniformizing contact pressure in the tread face.

Each of the land lines may have different void ratios between one side and the other side in a width direction in some case. As a typical example, there is a rib configuration having a plurality of notches open only on one side in a width direction. An area with a small void ratio has higher rigidity in a circumferential direction than an area with a large void ratio. Therefore, in the area with the small void ratio, a stretch degree in inflation is relatively low and, as a result, a contact property tends to reduce. Therefore, such a land line does not have the sufficient contact property in the land line and there is room for improvement of the contact property.

PRIOR ART DOCUMENTS

Patent Documents

Patent Document 1: JP-A-2017-030635
Patent Document 2: JP-A-2015-182680

SUMMARY OF THE INVENTION

The present invention has been made with the above-described circumstances in view and its object is to provide a pneumatic tire with enhanced contact properties of land lines.

The present invention provides a pneumatic tire comprising a tread face, a plurality of main grooves extending in a tire circumferential direction in the tread face, and a plurality of land lines defined by the plurality of main grooves on the tread face, wherein at least one of the plurality of land lines protrudes outward in a tire diametrical direction from a profile line, a void ratio of a first area positioned on one side of a center of a width of the at least one land line is larger than a void ratio of a second area positioned on the other side, and a protruding height of the second area from the profile line is larger than a protruding height of the first area. In this way, it is possible to help the second area with the relatively small void ratio come in contact with the ground to thereby enhance a contact property of the land line having the above-described first area and second area.

It is preferable that the land line has a void-less area extending in the tire circumferential direction and a position where the second area has a largest protruding height from the profile line is provided in a central portion of the void-less area in a width direction. In this way, it is possible to effectively enhance the contact property of the land line having the void-less area.

A height of an edge positioned on one side of the land line may be different from a height of an edge positioned on the other side of the land line. Such a configuration is convenient for forming a smooth top face of the land line having the above-described first area and second area.

A top face of the first area and a top face of the second area may be each formed in an arc shape protruding outward in the tire diametrical direction in a section along a tire meridian. In this configuration, the protruding height of the second area is larger than the protruding height of the first area, which enhances the contact property of the land line.

A top face of the first area is formed in an arc shape protruding inward in the tire diametrical direction in a section along a tire meridian and a top face of the second area is formed in an arc shape protruding outward in the tire diametrical direction in the section along the tire meridian, if a void ratio is much larger in a first area than in a second area, the top face of the first area may be formed in the arc shape protruding in the opposite direction in this manner. In this case, in order to secure contact of a portion including the edge of the first area with the ground, the edge positioned on one side of the land line may be tapered outward in the tire diametrical direction.

DETAILED DESCRIPTION OF THE PREFERRED EMBODIMENTS

Embodiments of the present invention will be described below with reference to the drawings.

Figure 1:
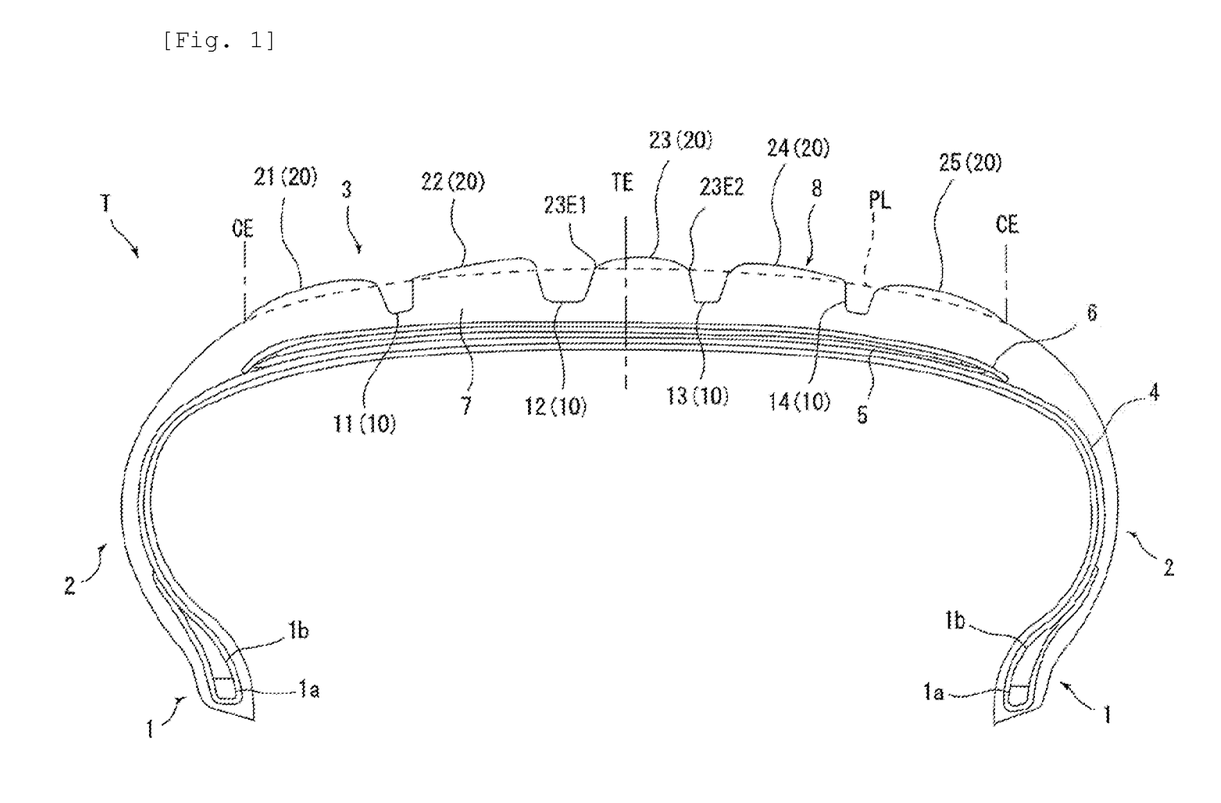
FIG. 1 is a schematic sectional view along a tire meridian of an example of a pneumatic tire according to the present invention.

As shown in FIG. 1, a pneumatic tire T includes paired bead portions 1, 1, paired sidewall portions 2, 2 respectively extending outward in a tire diametrical direction from the bead portions 1, and a tread portion 3 connected to outer ends in the tire diametrical direction of the respective sidewall portions 2. A carcass layer 4 is provided in a toroidal shape between the paired bead portions 1, 1. Each of end portions of the carcass layer 4 is rolled up to wrap a bead core 1$a$ and a bead filler 1$b$ embedded in the bead portion 1.

On an outer side of the carcass layer 4 in the tire diametrical direction, a belt layer 5, a belt reinforcing layer 6, and a tread rubber 7 are provided. The belt layer 5 includes a plurality of belt plies. The respective belt plies are formed by covering cords, extending obliquely with respect to a tire circumferential direction, with rubber. The belt plies are layered so that the cords cross each other in opposite orientations to each other in the respective plies. The belt reinforcing layer 6 is formed by covering cords, extending substantially in the tire circumferential direction, with rubber. A tread face 8 that forms an outer peripheral face of the tread rubber 7 is provided with a tread pattern.

Figure 2:
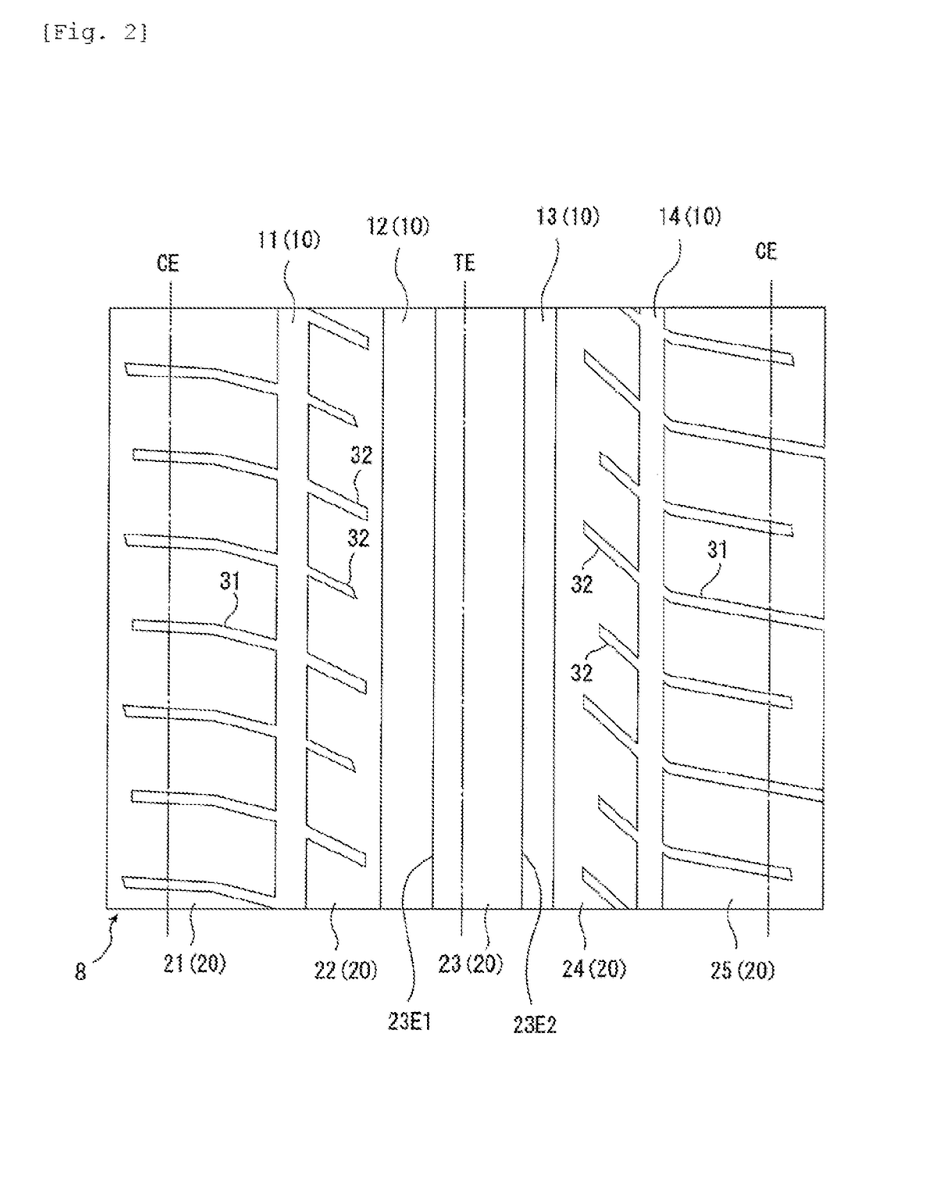
FIG. 2 is a developed view of a tread face.

As shown in FIGS. 1 and 2, the tread face 8 is provided with a plurality of main grooves 10 extending in the tire circumferential direction and a plurality of land lines 20 defined by the plurality of main grooves 10. Preferably, three or more main grooves 10 are provided. In the embodiment, four main grooves 10 are provided in the tread face 8 and five land lines 20 are defined by the four main grooves 10.

The four main grooves 10 include paired center main grooves 12, 13 positioned on left and right opposite sides of a tire equator TE and paired shoulder main grooves 11, 14 positioned on outer sides of the center main grooves 12, 13 in a tire width direction. The paired shoulder main grooves 11, 14 are positioned on outermost sides in the tire width direction among the plurality of main grooves 10. Although all of the four main grooves 10 are straight grooves, part or all of the main grooves 10 may be zigzag grooves. The five land lines 20 include a center land line 23 passing through the tire equator TE, paired mediate land lines 22, 24 positioned on outer sides of the center land line 23 in the tire width direction, and paired shoulder land lines 21, 25 positioned on the outer sides of the mediate land lines 22, 24 in the tire width direction.

The center land line 23 is provided between the paired center main grooves 12, 13. The mediate land line 22 is provided between the shoulder main groove 11 and the center main groove 12 and the mediate land line 24 is provided between the center main groove 13 and the shoulder main groove 14. The shoulder land line 21 is provided between the shoulder main groove 11 and a contact end CE and the shoulder land line 25 is provided between the shoulder main groove 14 and a contact end CE. The contact ends CE refer to outermost positions in the tire width direction of a contact face that comes in contact with a flat road surface when the tire mounted to a normal rim and inflated to normal internal pressure is placed vertically on the road surface and a normal load is applied to the tire.

The normal rim refers to a rim specified for each tire by standards in a standard system including the standards according to which tires are provided, and is "Standard Rim" in JATMA, "Design Rim" in TRA, or "Measuring Rim" in ETRTO, for example. The normal internal pressure refers to an air pressure specified for each tire by the standards in the standard system including the standards according to which tires are provided, and is "Maximum Air Pressure" in JATMA, a maximum value shown in Table, "TIRE LOAD LIMITS AT VARIOUS COLD INFLATION PRESSURES" in TRA, or "INFLATION PRESSURE" in ETRTO, however, in the case that the tire is for a passenger car, it is set to 180 kPa. The normal load refers to a load specified for each tire by standards in a standard system including the standards according to which tires are provided, and is "a maximum load capacity" in JATMA, a maximum value described in the Table in TRA, or "LOAD CAPACITY" in ETRTO, however, in the case that the tire is for a passenger car, it is 85% of a corresponding load to 180 kPa of internal pressure.

In the embodiment, the center land line 23 and the paired mediate land lines 22, 24 are formed as ribs respectively extending continuously in the tire circumferential direction. The center land line 23 and the mediate land lines 22, 24 are not provided with lateral grooves separating the land lines into blocks in the tire circumferential direction. The paired mediate land lines 22, 24 are respectively provided with a plurality of notches 32 formed at intervals in the tire circumferential direction. Each of the notches is a groove extending between one end portion open into the main groove and the other end closed in the land line. The paired shoulder land lines 21, 25 are formed as block lines in which a plurality of blocks separated from each other in the tire circumferential direction by the lateral grooves 31, respectively, are arranged. However, the respective land lines are not limited to the above-described configurations and may be ribs or block lines.

A profile line PL is an imaginary line passing through the closest edge among edges of the land lines 20 to the tire equator TE (hereinafter referred to as "closest edge") and the opposite contact ends CE, CE and forming a single arc in the section along a tire meridian. In the embodiment, an edge 23E1 positioned on the left side in the figures among edges 23E1, 23E2 of the center land line 23 is the closest edge. If the main grooves 10 are the zigzag grooves and the edges of the land lines 20 wind in the tire width direction, the closest edge is determined at a center of a width of the winding. If the edges of the land lines 20 have chamfered shapes, a point of intersection of an extended line of a top face of the land line 20 and an extended line of a groove wall face is regarded as the edge and the closest edge is determined. If there are two closest edges on left and right sides, one of the edges positioned on the inner side in the tire diametrical direction is employed.

Figure 3:
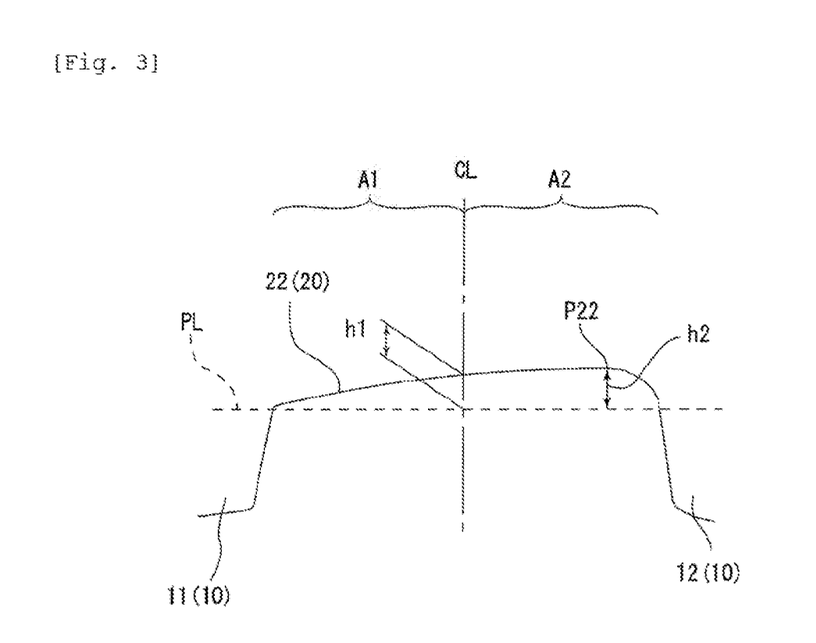
FIG. 3 is a sectional view of a mediate land line.
Figure 4:
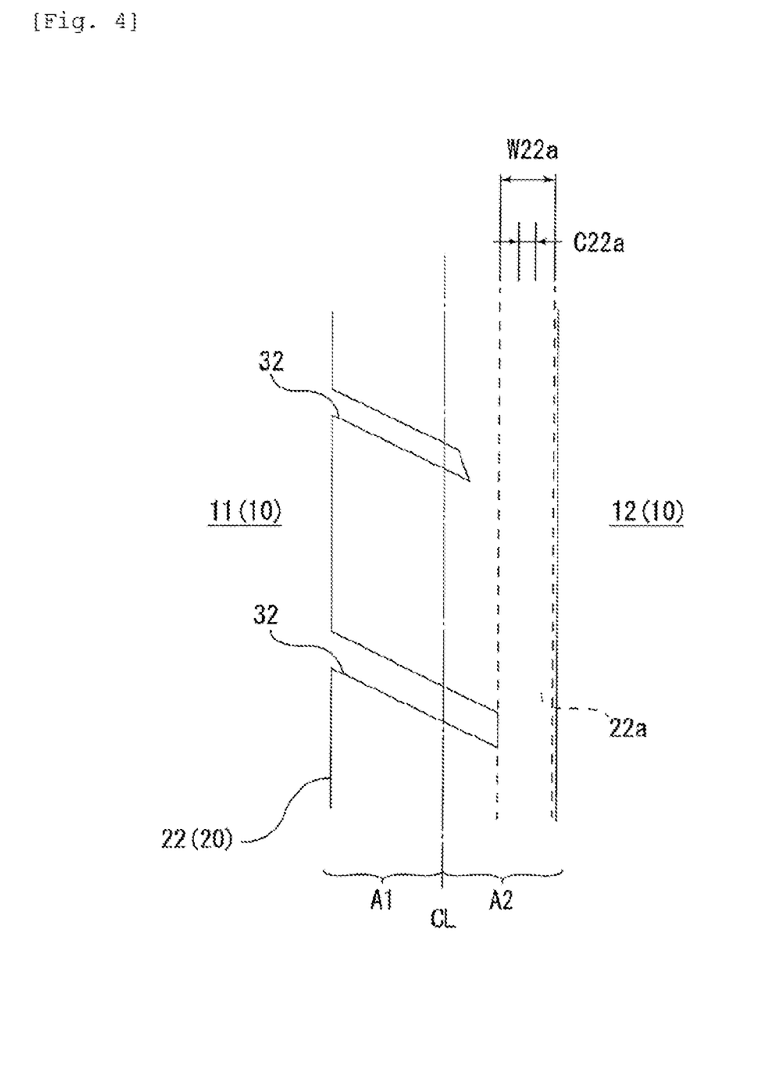
FIG. 4 is a plan view of the mediate land line.

As shown in FIGS. 3 and 4, in the embodiment, the mediate land line 22 (hereinafter merely referred to as "land line 22" in some cases) protrudes outward in the tire diametrical direction from the profile line PL. A void ratio V1 of a first area A1 positioned on one side (a left side in FIGS. 3 and 4) of a center of a width of the land line 22 is larger than a void ratio V2 of a second area A2 positioned on the other side (a right side in FIGS. 3 and 4) (i.e., V1>V2) and a protruding height h2 of the second area A2 from the profile line PL is larger than a protruding height h1 of the first area A1 (i.e., h1<h2).

A center line CL shown in FIGS. 3 and 4 is an imaginary line passing through the center of the width of the land line 22 and having a straight-line shape. The center line CL separates the land line 22 into the first area A1 and the second area A2. The void ratio is obtained as a value x/(x+y) by dividing an opening area x of a groove in a top face of a land line by the sum of an area y of a contact portion of the top face of the land line and the opening area x of the groove. Therefore, the void ratio V1 is obtained by dividing opening areas of the notches 32 in the first area A1 by the sum of an area of a contact portion of the first area A1 and the opening areas of the notches 32. The void ratio V2 is obtained similarly. A void ratio difference (V1−V2) is 3(%) or larger, for example.

The land line 22 is the rib having the notches 32 open only on one side and the void ratio is smaller in the second area A2 than in the first area A1 as described above. Therefore, in the second area A2, a stretch degree is relatively low in inflation and, as a result, a contact property tends to reduce. However, the protruding height h2 is larger than the protruding height h1 in the tire T, which helps the second area A2 come in contact with the ground to enhance a contact property of the land line 22. The enhancement of the contact property of the land line 22 contributes to improvement of a contact property of the tread face 8, which increases irregular wear resistance and braking performance.

As shown in FIG. 3, in the embodiment, a top face of the first area A1 and a top face of the second area A2 are each formed in an arc shape protruding outward in the tire diametrical direction in the section along the tire meridian.

In the section along the tire meridian, the top face of the land line 22 is formed by smoothly connecting a plurality of arcs having different radiuses of curvature and is formed, as a whole, in an arc shape protruding outward in the tire diametrical direction. A peak P22 is a position where the top face of the land line 22 has the largest protruding height from the profile line PL and is provided in the second area A2.

In the embodiment, the land line 22 has a void-less area 22a extending in the tire circumferential direction. The void-less area 22a is an area not provided with grooves or sipes and extends in an annular shape along the tire circumferential direction in the case of the rib as in the embodiment. In the case of a block line, a void-less area extends continuously in a tire circumferential direction between lateral grooves. The position (peak P22) where the second area A2 has the largest protruding height from the profile line PL is preferably provided in a central portion C22a of the void-less area 22a in the width direction. The central portion C22a in the width direction is in a range of 45% of a width W22a of the void-less area 22a centered at the center of a width of the void-less area 22a. Although the stretch degree tends to be especially low in the inflation in the void-less area 22a, the provision of the peak P22 in the central portion C22a effectively enhances the contact property of the land line 22.

In the embodiment, the above-described configuration for enhancing the contact property of the land line is applied to each of the paired mediate land lines 22, 24. The mediate land line 24 has a top face shape similar to that of the mediate land line 22 except that the positional relationship between the first area and the second area is reversed. In the mediate land line 24, both of the above-described relationships, i.e., V1>V2 and h1<h2 are satisfied. The land line(s) to which the configuration for enhancing the contact property is applied is/are preferably the center land line and/or the mediate land line(s).

Although the five land lines 20 each protrude outward in the tire diametrical direction from the profile line PL in the example shown in the embodiment, the invention is not limited to this example. At least one of a plurality of land lines 20 needs to protrude outward in a tire diametrical direction from a profile line PL and it suffices that the configuration for enhancing the contact property is applied to the land line protruding outward in the tire diametrical direction from the profile line PL.

Because variations described by using FIGS. 5 to 7 have the same configurations as that of the above-described embodiment except configurations described below, the common configurations will not be described and differences will be mainly described. The configurations described in the above embodiment will be provided with the same reference signs and will not be described repeatedly. The plurality of variations described can be employed in combination without specific constraints.

Figure 5:
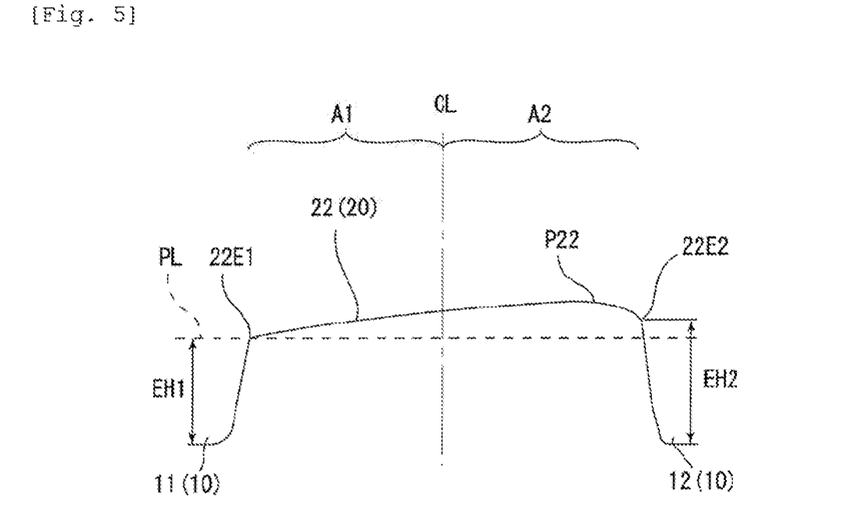
FIG. 5 is a sectional view of a mediate land line according to another embodiment of the invention.

In a variation shown in FIG. 5, a height EH1 of an edge 22E1 positioned on one side of a land line 22 is different from a height EH2 of an edge 22E2 positioned on the other side of the land line 22. To put it concretely, the height EH2 of the edge 22E2 included in a second area A2 is larger than the height EH1 of the edge 22E1 included in the first area A1. The heights EH1, EH2 are heights from groove bottoms of main grooves 10, respectively. Such a configuration is convenient for satisfying a relationship, h1<h2 and forming a smooth top face of the land line 22 by connecting a plurality of arcs having difference radiuses of curvature.

Figure 6:
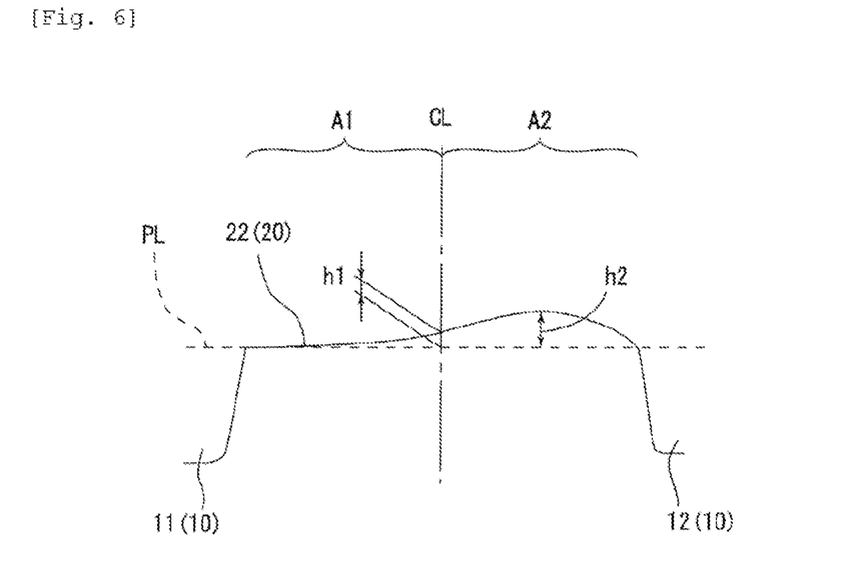
FIG. 6 is a sectional view of a mediate land line according to another embodiment of the invention.

In a variation shown in FIG. 6, a top face of a first area A1 is formed in an arc shape protruding inward in a tire diametrical direction in a section along a tire meridian and a top face of a second area A2 is formed in an arc shape protruding outward in the tire diametrical direction in the section along the tire meridian. A top face of a land line 22 is formed by smoothly connecting a plurality of arcs having different directions of curves. In this configuration, a relationship, h1<h2 is satisfied. If a void ratio V1 is much larger than a void ratio V2, the top face of the first area A1 may be formed in the arc shape protruding in the opposite direction.

Figure 7:
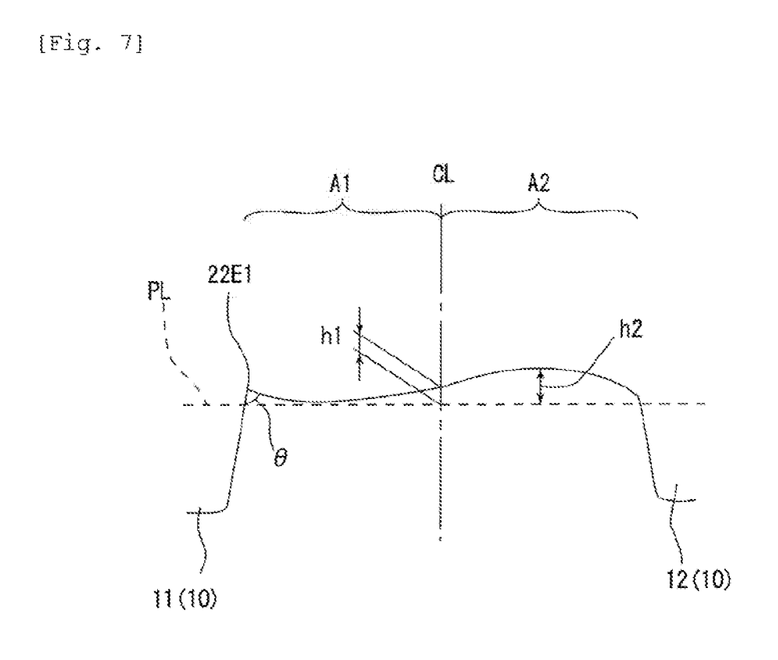
FIG. 7 is a sectional view of a mediate land line according to another embodiment of the invention.

In a variation shown in FIG. 7, a top face of a first area A1 is formed in an arc shape protruding inward in a tire diametrical direction in a section along a tire meridian and a top face of a second area A2 is formed in an arc shape protruding outward in the tire diametrical direction in the section along the tire meridian. Moreover, an edge 22E1 positioned on one side of a land line 22 is tapered outward in the tire diametrical direction. The edge 22E1 is formed to have an acute angle (θ<90 degrees) in a warped shape. In this way, while forming the top face of the first area A1 in the arc shape protruding in the opposite direction, it is easy to secure a contact property around the edge 22E1.

The pneumatic tire according to the invention can be formed in the same way as a normal pneumatic tire except that the tread face is formed in the above-described manner. Therefore, any of conventionally known materials, shapes, configurations, and manufacturing methods can be employed in the invention.

The present invention is not limited to the embodiment mentioned above, but can be improved and modified variously within the scope of the present invention.

What is claimed is:

1. A pneumatic tire comprising:
   a tread face;
   a plurality of main grooves extending in a tire circumferential direction in the tread face; and
   a plurality of land lines defined by the plurality of main grooves on the tread face,
   wherein at least one of the plurality of land lines protrudes outward in a tire diametrical direction from a profile line,
   a void ratio of a first area positioned on one side of a center of a width of the at least one land line is larger than a void ratio of a second area positioned on the other side of a center of a width of the at least one land line;
   a protruding height of the second area from the profile line is larger than a protruding height of the first area,
   wherein the at least one land line has a void-less area extending in the tire circumferential direction and
   a position where the second area has a largest protruding height from the profile line is provided in a central portion of the void-less area in a width direction;
   wherein a top face of the first area is formed in an arc shape protruding inward in the tire diametrical direction in a section along a tire meridian and a top face of the second area is formed in an arc shape protruding outward in the tire diametrical direction in the section along the tire meridian, and
   an edge positioned on one side of the at least one land line is tapered outward in the tire diametrical direction.

2. The pneumatic tire according to claim 1, wherein a height of an edge positioned on one side of the at least one land line is different from a height of an edge positioned on the other side of the land line.

3. The pneumatic tire according to claim 2, wherein the height of the edge included in the second area is larger than the height of the edge included in the first area.

4. The pneumatic tire according to claim 1, wherein the at least one land line is a rib having a notch open only on one side.

5. The pneumatic tire according to claim 1, wherein the at least one land line is a center land line passing through a tire equator or a mediate land line positioned on an outer side of the center land line in a tire width direction.

6. The pneumatic tire according to claim 1, wherein a top face of the first area and a top face of the second area are each formed in an arc shape protruding outward in the tire diametrical direction in a section along a tire meridian.

7. The pneumatic tire according to claim 1, wherein the at least one land line has a notch, the notch having a first end open to one of the plurality of main grooves and a second end closed within the at least one land line, and wherein the notch is not formed in the void-less area.

* * * * *